US006484752B1

(12) United States Patent
Ebinger et al.

(10) Patent No.: US 6,484,752 B1
(45) Date of Patent: Nov. 26, 2002

(54) AUTO CONCRETE PUMP

(75) Inventors: Willi Ebinger, Steinenbronn (DE); Dieter Schneider, Filderstadt (DE); Alexander Huslik, Engstingen (DE)

(73) Assignee: Putzmeister Aktiengesellschaft (DE)

( * ) Notice: Subject to any disclaimer, the term of this patent is extended or adjusted under 35 U.S.C. 154(b) by 0 days.

(21) Appl. No.: 09/674,885

(22) PCT Filed: Sep. 15, 1999

(86) PCT No.: PCT/EP99/06816

§ 371 (c)(1), (2), (4) Date: Nov. 7, 2000

(87) PCT Pub. No.: WO00/19039

PCT Pub. Date: Apr. 6, 2000

(30) Foreign Application Priority Data

Sep. 28, 1998 (DE) ........................................ 198 44 341
Oct. 30, 1998 (DE) ........................................ 198 50 009

(51) Int. Cl.$^7$ .............................. B65D 5/64; F16L 3/00
(52) U.S. Cl. ....................................... 137/615; 141/387
(58) Field of Search ......................... 137/615; 141/387; 366/68

(56) References Cited

U.S. PATENT DOCUMENTS 4,130,134 A * 12/1978 Castle ........................ 137/615
5,535,780 A * 7/1996 Schlecht et al. ............ 137/615
6,164,923 A * 12/2000 Mayer et al. ............... 417/212

FOREIGN PATENT DOCUMENTS

| | | | |
|---|---|---|---|
| DE | 2 003 519 | 8/1970 | |
| DE | 2021 903 | 11/1971 | |
| FR | 1 562 083 | 1/1968 | |
| FR | 2 247 400 | 10/1974 | ........... B65G/15/22 |

* cited by examiner

*Primary Examiner*—A. Michael Chambers
(74) *Attorney, Agent, or Firm*—Pendorf & Cutliff

(57) ABSTRACT

A mobile concrete pump comprising a supporting frame (16) mounted on a chassis (10) and a pump unit (30) disposed on the supporting frame (16) and having a rear material feeder container (32). Conveyor pipes or tubes (38, 40) can be connected to the pump unit (30), and can be transported in magazines (42, 44) along with the automatic concrete pump. The magazines can be easily accessed when they are moved from a transport position substantially parallel to the loading area (48, 50) into a removal or unloading position, with back end tilting downwards, by rotating said magazines around an axis of rotation (52, 54) parallel to the vertical axis of the chassis and tilting around a tilting axis (56, 58) which runs crosswise in relation to their longitudinal axis and perpendicular to the vertical axis of the chassis. Rotation and tilting of the magazines (42, 33) can be done manually or using hydraulic means.

31 Claims, 14 Drawing Sheets

72
44
84
80
58
54
24
16

44
58
54
16

44
74
76
78
72

44
76
78
74
72

AUTO CONCRETE PUMP

BACKGROUND OF THE INVENTION

1. Field of the Invention

The invention concerns a mobile or auto concrete pump with a chassis, which exhibits at least one loading surface on one side running parallel to the vehicle chassis axis. Preferably one supporting frame is provided on the vehicle chassis, on which frame are provided a rearward facing material supply container including a pump unit, and a concrete distribution mast which can be unfolded, wherein conveyor pipes or hoses can be connected to the pump unit or, alternatively, to the distribution mast, and wherein at least one accessible loading surface is provided on one side of the supporting frame, preferably beside the distribution mast when the mast is stowed in the driving position. Since the supporting frame is rigidly connected with the chassis, in the following the supporting frame is viewed as belonging to the vehicle chassis.

2. Description of the Related Art

In mobile concrete pumps of the hitherto known type (WO 95/30088) the pressure side of the pump unit is connectable, via a pipe switch or pivot pipe, with a conveyor line of the distribution mast. There are however applications in which a separate pipe or hose is coupled directly on the pump unit in the area of the pivot pipe while the conveyor line of the concrete distribution mast is decoupled. This is above all the case when the area to be provided with concrete cannot be reached with the concrete distribution mast. In order to make possible this method of operation, a storage space must be provided on the mobile concrete pump, in which the pipes and/or hoses can be transported.

SUMMARY OF THE INVENTION

Beginning herewith it is the task of the invention to make provisions in a mobile concrete pump which make it possible to store the pipes and hoses in the area of the loading surface such that they are easily accessible from the outside and nevertheless to keep the loading surface accessible.

The inventive solution is based upon the concept, that a longitudinally extending, box-shaped magazine for receiving of conveyor pipes or hoses is provided, which is pivotable or slideable between a transport position extending over the loading surface and an unloading position in which the loading surface is exposed. According to a first inventive alternative the magazine is pivotable about a rotation axis parallel to the vehicle chassis vertical axis from a transport position covering over the loading surface and an unloading position at least partially exposing the loading surface. According to a preferred embodiment of the invention the magazine is supplementally tiltable about an axis of rotation running crosswise across its longitudinal axis and oriented perpendicularly to the vertical axis of the vehicle chassis, such that it is tiltable from the transport position oriented essentially parallel to the loading surface into an unloading position with its rearward end pivotable downwardly to a limited extent. The transverse axis and the tilt axis thereby preferably form a type of cardanic or gimbal linkage. By lowering the backend of the magazine the user has the possibility of varying the unloading height. This produces a substantial reduction in workload and saves time during unloading and loading.

Further it is known with respect to mobile concrete pumps (DE-A 197 36 108), to provide on the two longitudinal sides of the vehicle chassis or the supporting frame respectively one rear end support strut, which is pivotable about a pivot axis parallel to the vehicle chassis vertical axis between (a) a transport position oriented and parallel to the vehicle chassis longitudinal axis and covering over the respective loading surface and (b) a support position exposing at least a part of the loading surface. In this case it is advantageous when the magazine is provided in a free space above this support strut. Thereby at least one of the magazine and one of the rotate and/or tilt forming vehicle chassis fixed linkage point be linked. Alternatively thereto, or supplementally, at least one of the rotation and/or tilt axis forming linkage points of the magazine can be secured to the support strut. The magazine is thereby preferably linked on its bottom side to the linkage point. Advantageously, the magazine is arrestable on the supporting frame or the support strut in its transport position. When the support strut and magazine are pivoted out, the side loading surfaces are accessible, so that the pump unit is easily accessible for example for servicing purposes.

In accordance with a preferred embodiment of the invention the linkage point, includes a knee or cantilever which is rotatable about a rotation axis parallel to the vehicle chassis vertical axis, is provided on the transport frame or on the support strut, while the magazine is provided pivotable about the tilt axis on the knee. It is thereby of advantage when the tilt axis is provided approximately centrally in the longitudinal run of the magazine and on the bottom side thereof, whereby the center of gravity of the magazine when in the transport position and, on the other hand, when in the extraction position, is positioned on opposite sides of the vertical projection of the tilt axis. Therewith it is achieved that the magazine both in the horizontal transport position as well also in the tilted extracted position is maintained stably due to its own weight. In addition the rotation and/or tilt movement of the magazine can be limited by a stop element or an abutment.

In accordance with a further preferred embodiment of the invention, drive means for pivoting the magazine between the transport position and the rotated out and tilted end position is provided between the vehicle chassis and magazine, preferably formed as a linkage drive spaced apart from the rotation and/or tilt axis. The drive means is preferably operated by motor or with hydraulic means.

In accordance with yet a further alternative embodiment of the invention the longitudinally extending box shaped magazine is moveable, tiltable or unfoldable between a transport position extending over the loading surface and an unloading position parallel thereto and provided beside and/or below the loading surface. Thereby the magazine can, in the transport position, lay upon the loading surface and in certain cases be arrested on the vehicle chassis.

In accordance with a preferred embodiment of this inventive alternative, the magazine is linked to the vehicle chassis by means of a four linkage coupling drive, of which the linkage axis is oriented parallel to the vehicle longitudinal axis. The coupling drive thereby preferably exhibits two swing or oscillating shafts, linked with their one end respectively spaced apart from each other on linkage points on the vehicle chassis, and linked with their respective other ends to linkage points spaced apart from each other on the magazine bottom bottom. The swing arms, the coupling element formed by the magazine floor and the framework elements formed by the linkage points on the vehicle chassis are preferably so positioned and dimensioned, that the magazine floor both in the transport position as well also in the extended or unfolded position is oriented parallel to the loading surface and in the intermediate positions swings away over the free side edge of the loading surface without contact. In a preferred manner the first, longer swing arm is linked to the outer edge corner and the second, shorter swing arm is linked to the inner edge corner of the magazine bottom whereby the chassis side linkage point of the first swing arm is provided below the chassis side linkage point of the second swing arm and wherein preferably the linkage point of the first swing arm on the vehicle chassis is displaced inwardly sideways with respect to the linkage point of the second swing arm. Therewith it is possible, that at least one of the swing arms, preferably the shorter, second swing arm, prior to reaching the transport position runs through a higher lying dead center point than the magazine side linkage point, so that the magazine in the transport position lies stably on the loading surface. In order to simplify the operation of the magazine or to automate the movement thereof, it is proposed in accordance with a preferred embodiment of the invention, that between a chassis fixed linkage point and a linkage point of one of the moveable coupling elements a gas-pressure spring or a hydraulic cylinder is so linked, that the dive-in depth of the plunger of the gas pressure spring or, as the case may be, the piston rod of the hydraulic cylinder, increases or decreases continuously in the associated cylinder along the pivot path between the transport position and the unfolded position to the side. Advantageously, the gas pressure spring or the hydraulic cylinder is linked at a linkage point of the shorter, second swing arm, which is positioned above the chassis-fixed linkage point.

For stabilization of the pivot process it is advantages when the drive pair is comprised of two same-axis four-linkage coupling drives in the vehicle chassis longitudinal direction and provided spaced apart from each other. Thereby each of the four-linkage coupling drives can be provided with a gas pressure spring or a hydraulic cylinder with same-axis linkage points. Basically it is however also possible, that the two four-linkage coupling drives are provided with only one gas pressure spring or one hydraulic cylinder.

In place of a hydraulic cylinder, the four-linkage coupling drive can also be driven by motor means, for example, using a hydraulic motor.

In order to achieve a manageable stowing of the hoses or pipes in the magazine and to facilitate the loading of the magazine, it is proposed in accordance with an advantageous embodiment of the invention, that the magazine is subdivided into multiple chambers oriented in honeycomb fashion parallel to each other in the longitudinal direction, separated from each other by intermediate walls. At least one part of the chambers can be formed by tubes, preferably of plastic.

BRIEF DESCRIPTION OF THE DRAWING

The following the invention will be described in greater detail on the basis of the illustrative embodiments shown in schematic manner in the drawings. There is shown FIG. 1 a elevated perspective representation of a mobile concrete pump with a hose magazine on the side in the transport position.

DETAILED DESCRIPTION OF THE INVENTION

Figure 1:
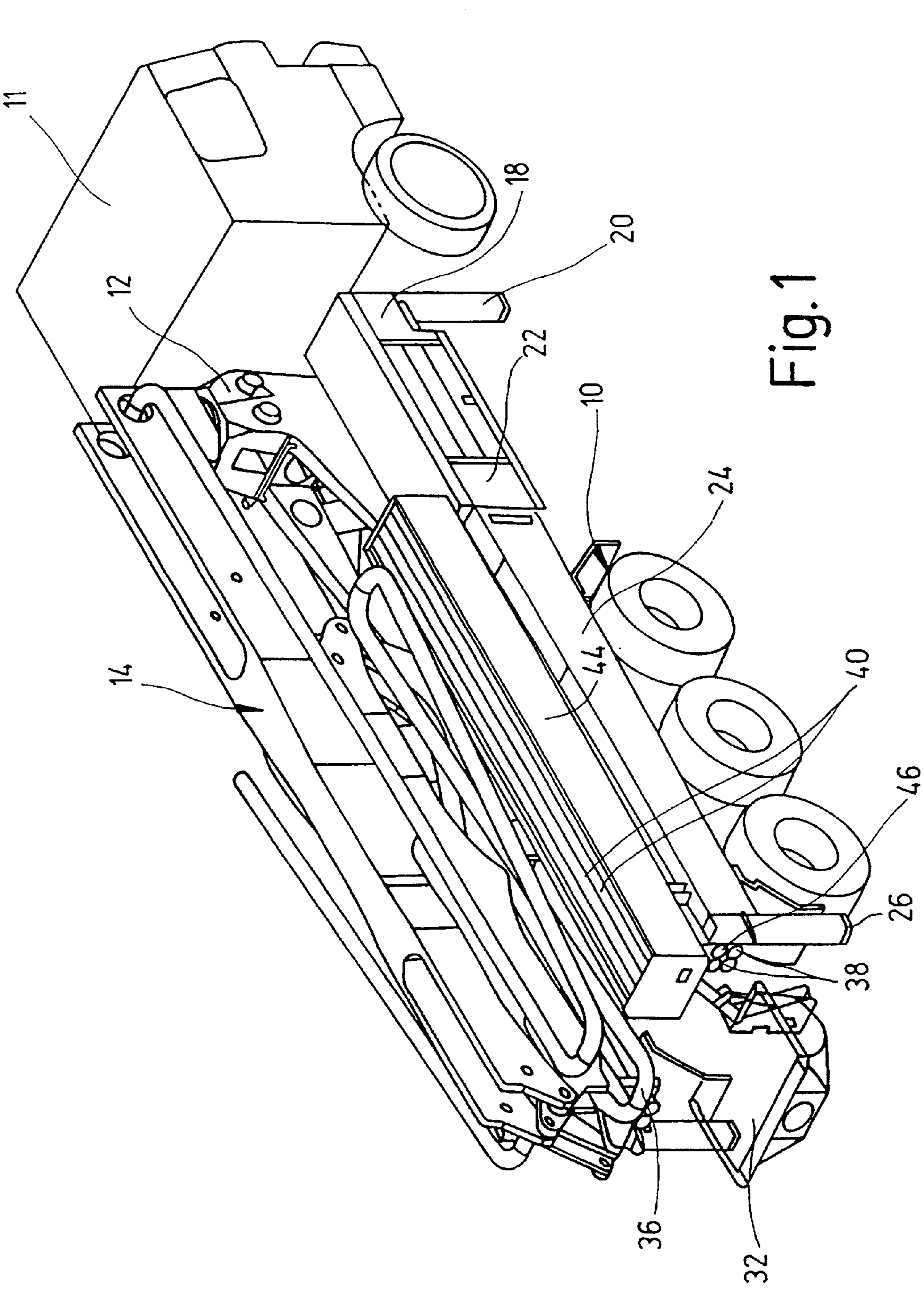

The mobile concrete pump shown in FIGS. 1 through 4 is comprised essentially of a multi-axle vehicle chassis 10, with a driver cabin 11, a concrete distribution mast 14 mounted rotatably about a vertical axis on a mast block 12 near the forward axle and a support construction which includes a supporting frame 16 fixed to the vehicle chassis, two front support struts 20 retractable in diagonally oriented slide boxes 18 on the supporting frame 16 and two rear support struts 24 pivotable about an axis 22 parallel to the vehicle chassis vertical axis. The support struts 20, 24 are supportable upon the ground 28 with respectively one downwardly extendable foot part 26.

On the supporting frame 16 there is further provided a pump unit 30 constructed as a two cylinder thick material pump, which on the pressure side is connected with the conveyor pipes 36 of the concrete distribution mast 14 via a pipe switch extending in the material supply container 32. The pipe switch 34 can be decoupled from the conveyor pipes 36 of the distribution mast 14 at a separation point 37 and be connected with therefrom independent conveyor pipes and/or hoses 38, 40. The conveyor pipes or hoses 38, 40 are provided in their own magazines 42, 44, 46 provided therefor on the vehicle chassis 10.

Figure 4:
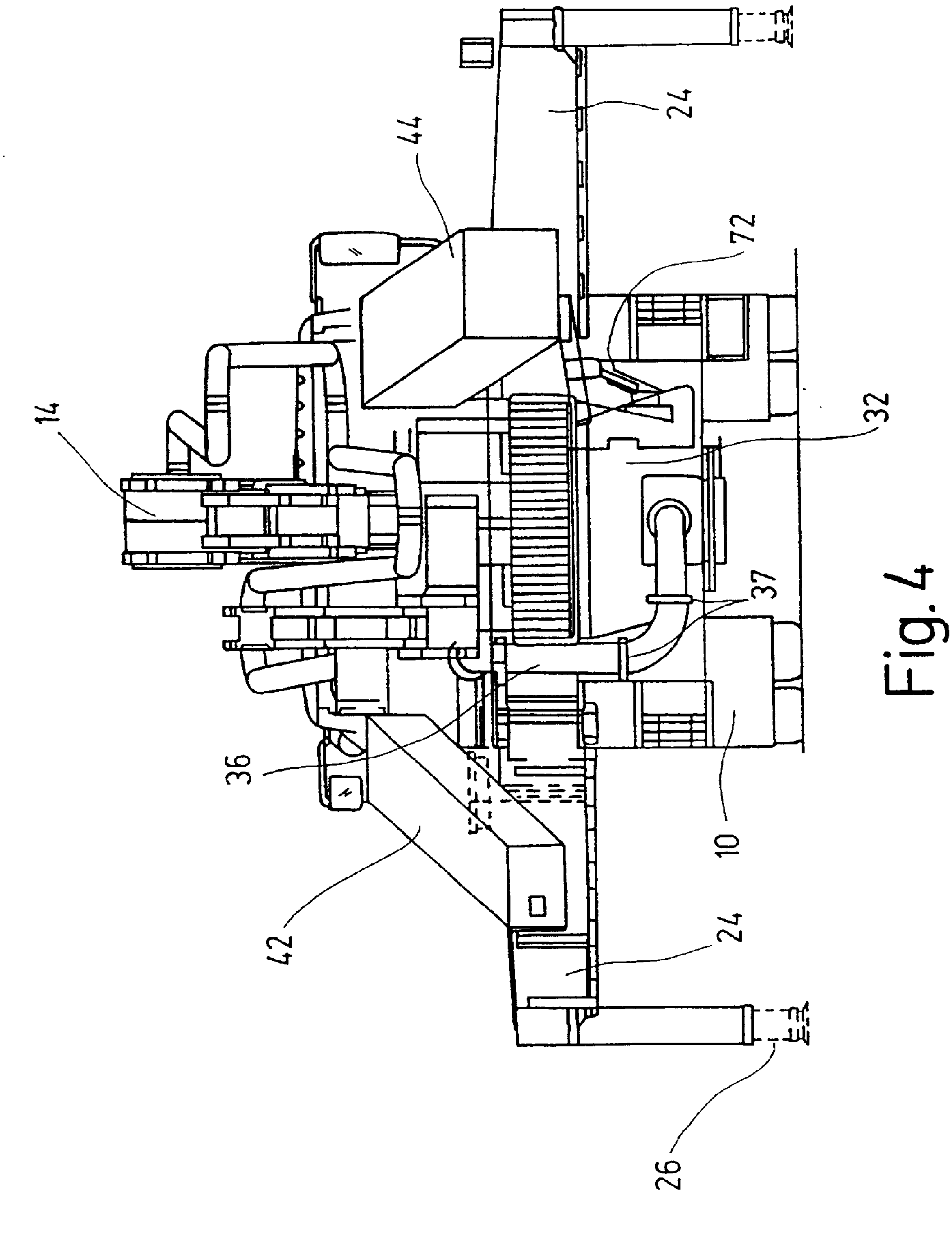
FIG. 4 a view of the mobile concrete pump from the back with magazine in unloading position.

In the embodiment of a mobile concrete pump shown in FIGS. 1 through 8 there is provided a manually pivotable hose magazine 42, a hydraulically pivotable hose magazine 44 as well a pipe magazine 46 integrated on one of the support struts or legs 24. The longitudinally extending hose magazines 42, 44 are provided atop the side loading surfaces 48, 50 of the supporting frame 16 and are provided pivotable about respectively one rotation axis 52, 54 parallel to the vehicle chassis vertical axis, pivotable from a transport position extending over the loading surface (FIG. 3*a*) into an unloading position (FIG. 3*c*) which exposes at least a part of the side loading surface 48, 50. Supplementally, the magazines are tiltable about a tilt axis 56, 58 oriented crosswise to their longitudinal direction and perpendicular to the vehicle chassis vertical axis from a transport position oriented essentially parallel to the loading surface 48, 50 into an unloading position in which the rear is limitedly lowerable downward (FIGS. 3*c*, 4). The rotation axis 52, 54 together with the associated tilt axis 56, 58 form a type of cardanic linkage.

Figure 2A:
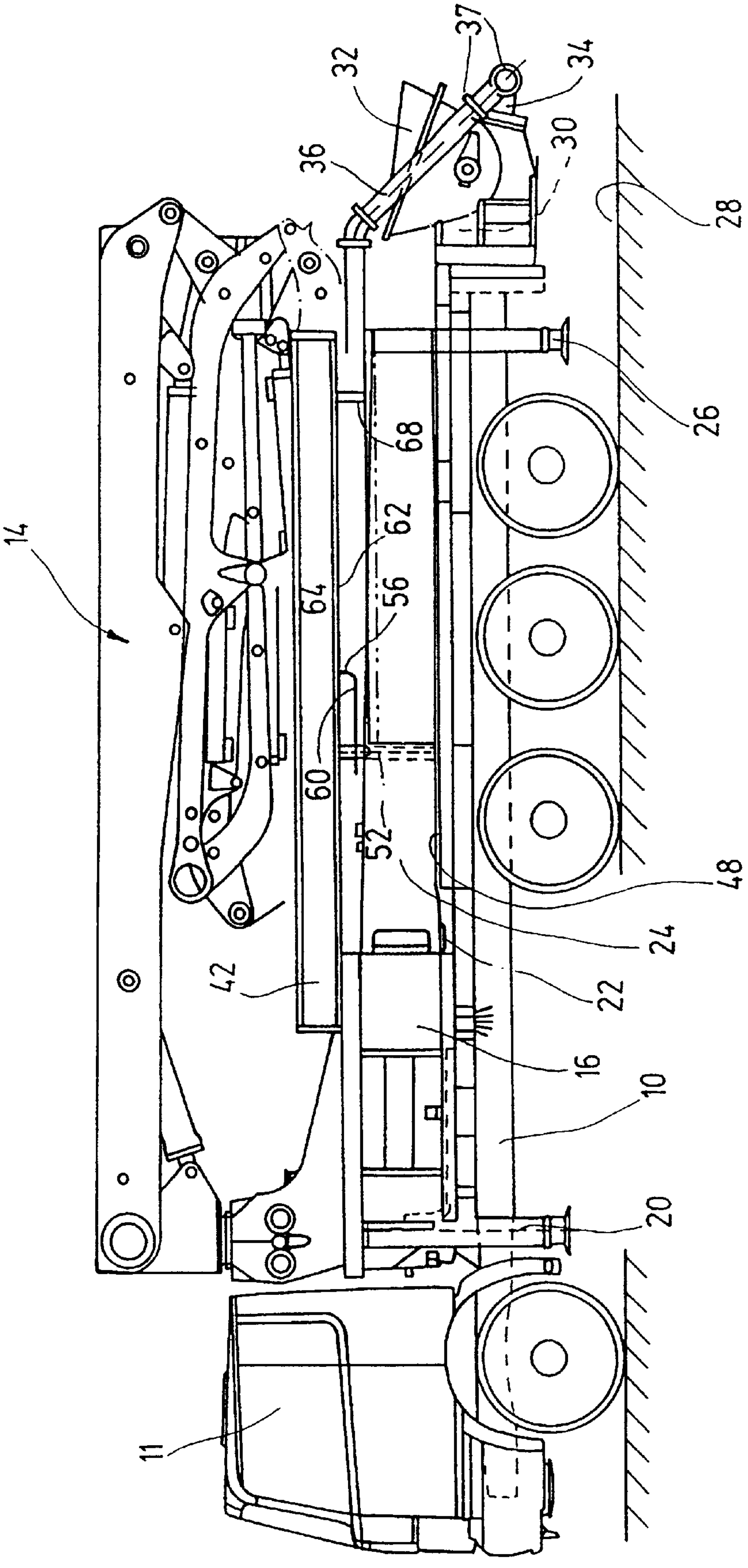
FIG. 2*a* a side view of the mobile concrete pump with a view on the manually rotatable and lowerable magazine.
Figure 2B:
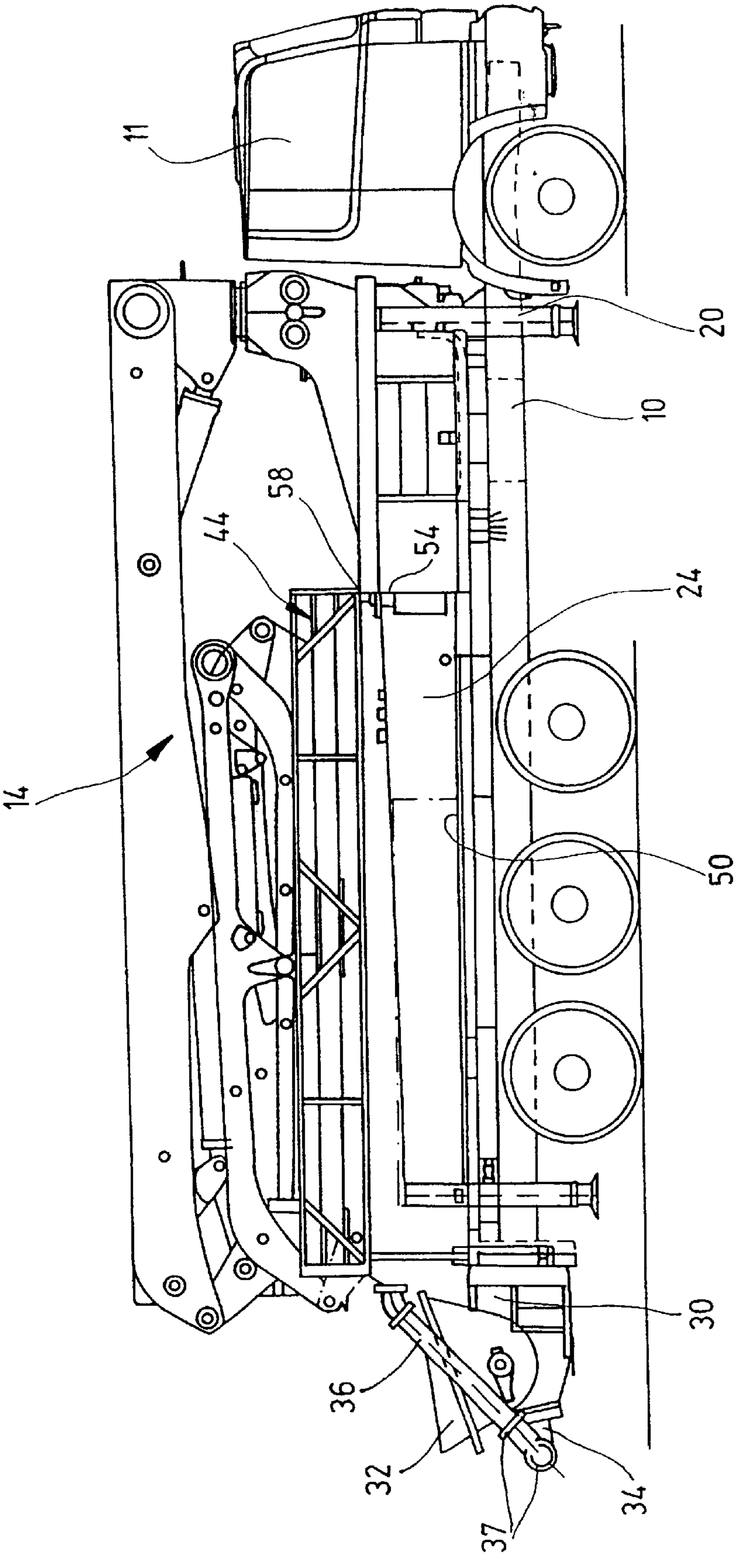
FIG. 2*b* a side view of the mobile concrete pump from the other side with view to the hydraulically pivotable and lowerable magazine.
Figure 3A:
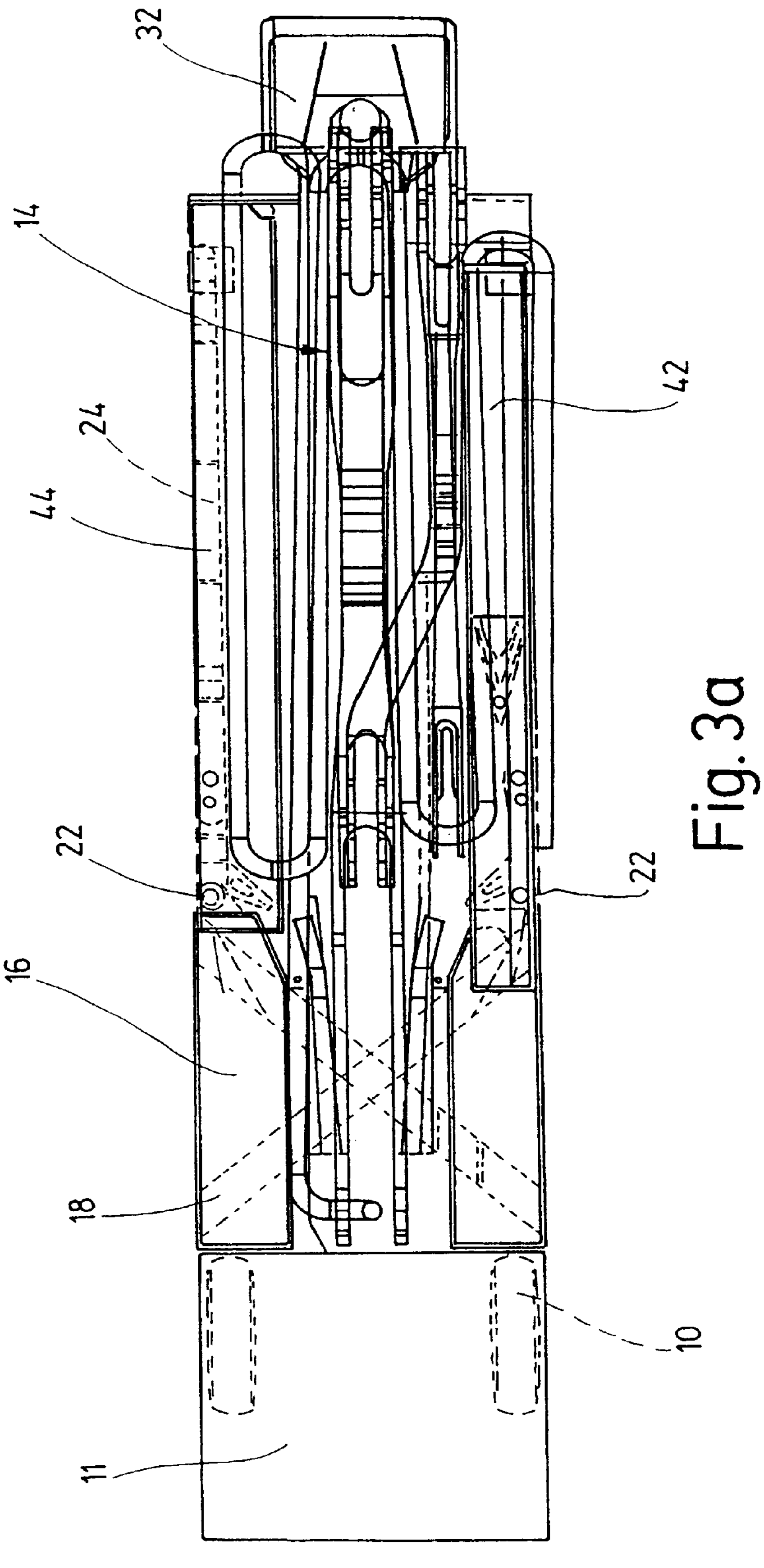
FIG. 3*a* a top view onto the mobile concrete pump with support struts and magazine in transport position.
Figure 3B:
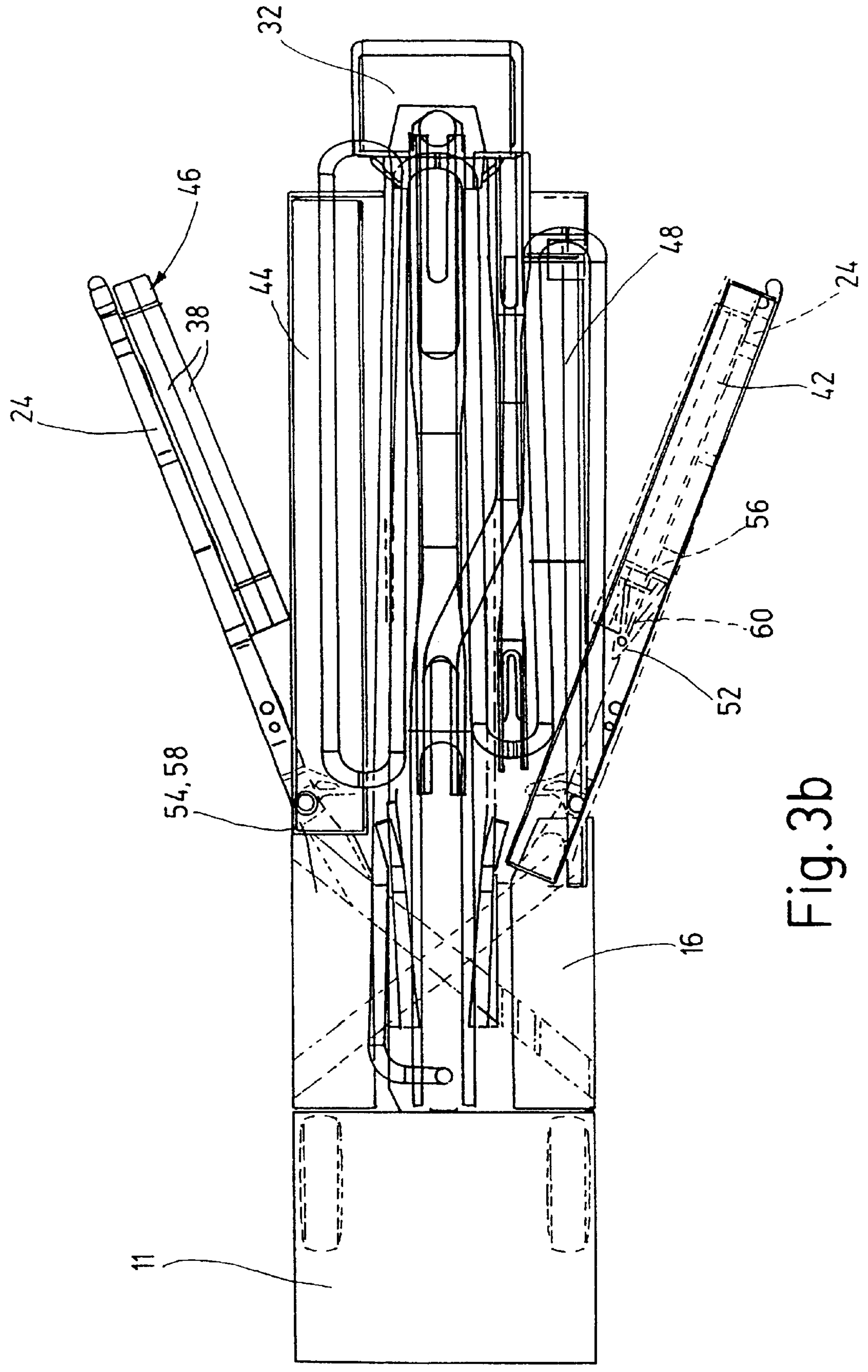
FIG. 3*b* a top view according to FIG. 3*a* with folded out rearward-facing support struts.
Figure 3C:
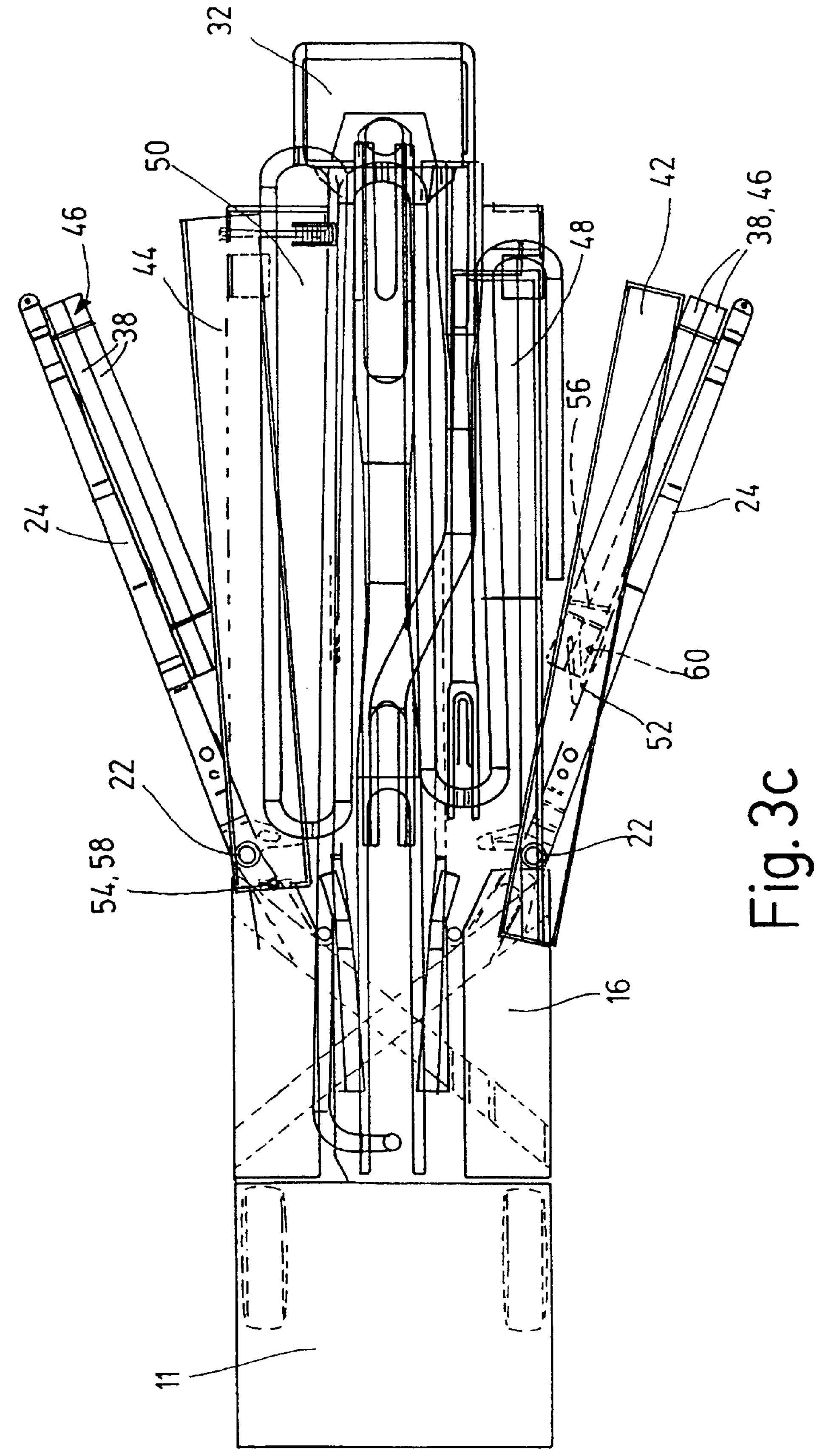
FIG. 3*c* a top view according to FIG. 3*b* with magazine in unloading position.

As can be seen from FIGS. 2*a* and *b*, the magazines 42, 44 are respectively provided in a free space between the adjacent support strut 24 and the distribution mast 14, and above the support strut 24. The manually pivotable magazine 42 is linked on one of the support strut fixed pivot points forming rotation axis 52 and tilt axis 56. The linkage point includes a knee 60, which is provided pivotable about the vertical rotation axis 52 on the associated support strut 24 and on which the magazine 42 is provided limitedly tiltable about the tilt axis 56.

Figure 6B:
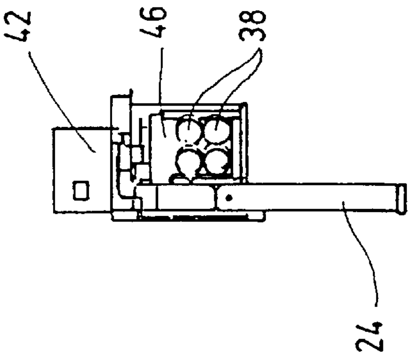
FIGS. 6*a* through *c* a side view, a rear view and a top view of the other support strut and the manually pivotable magazine in transport position.
Figure 6A:
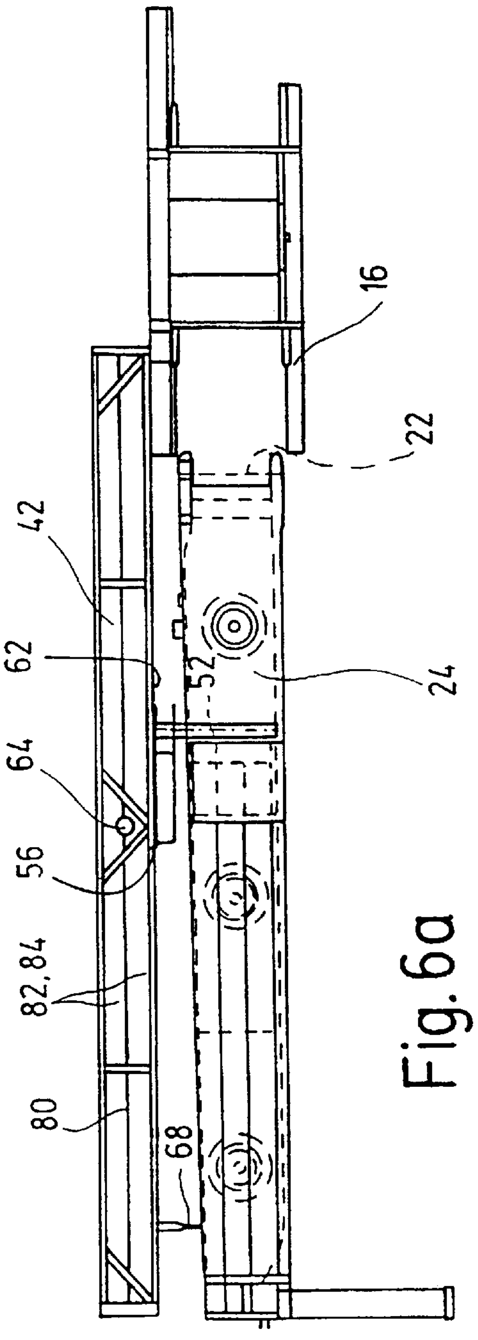
Figure 6C:
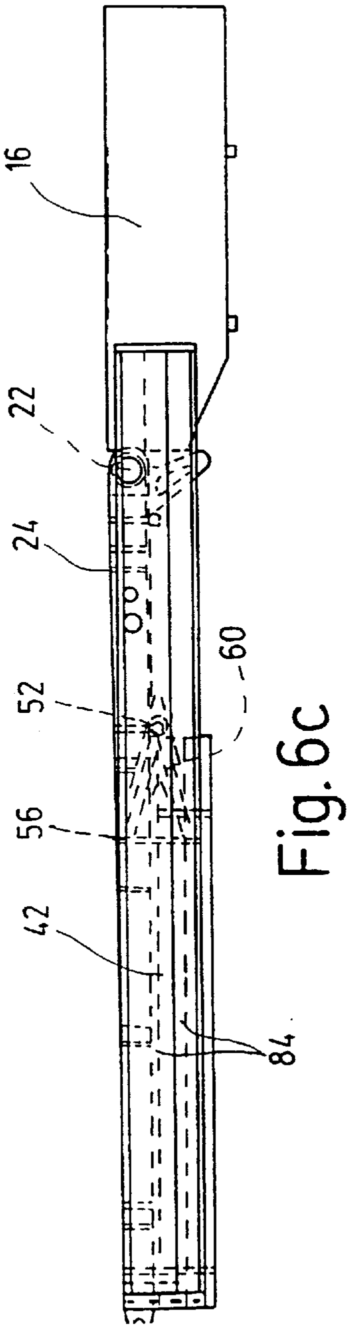
Figure 7A:
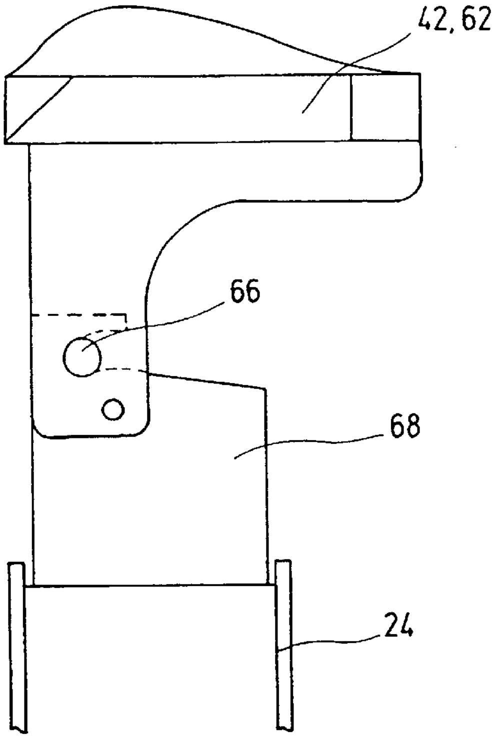
FIGS. 7*a* and *b* two side views rotated with respect to each other about 90° of the arresting mechanism for the manually pivotably magazine.
Figure 7B:
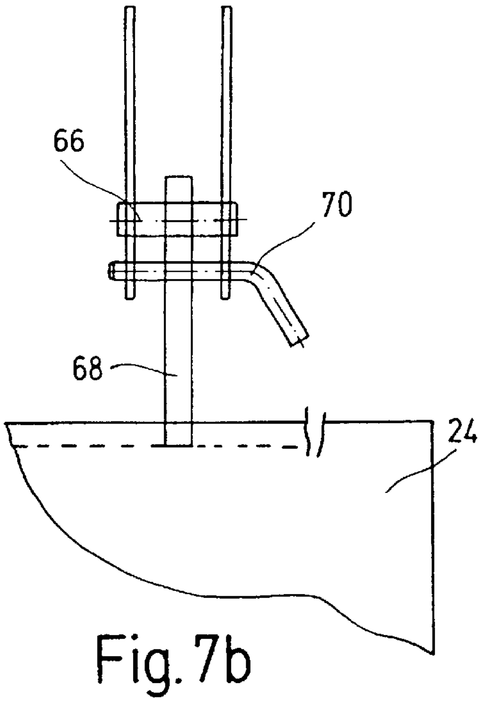
Figure 8A:
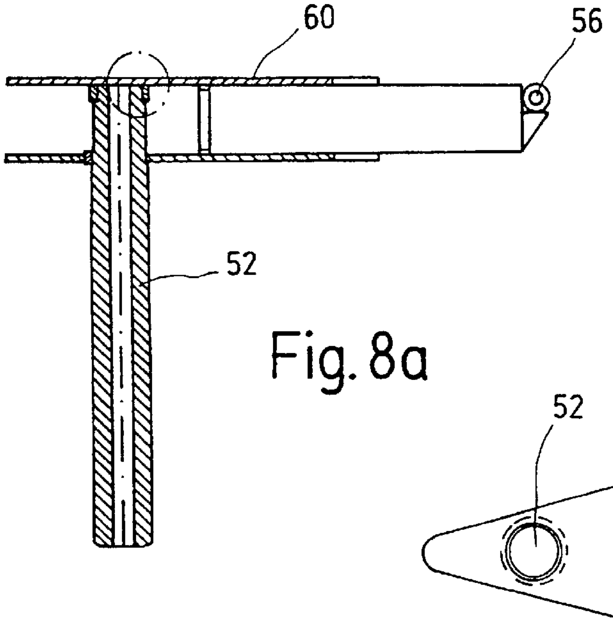
FIGS. 8*a* and *b* the linkage knee for the manually pivotable magazine in two different, partially sectional representations.
Figure 8B:
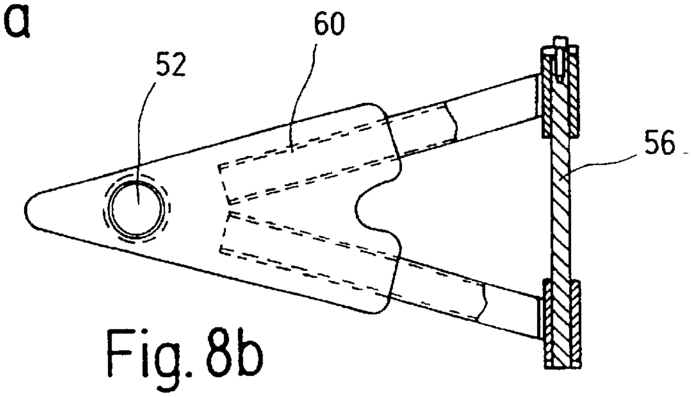
Figure 9A:
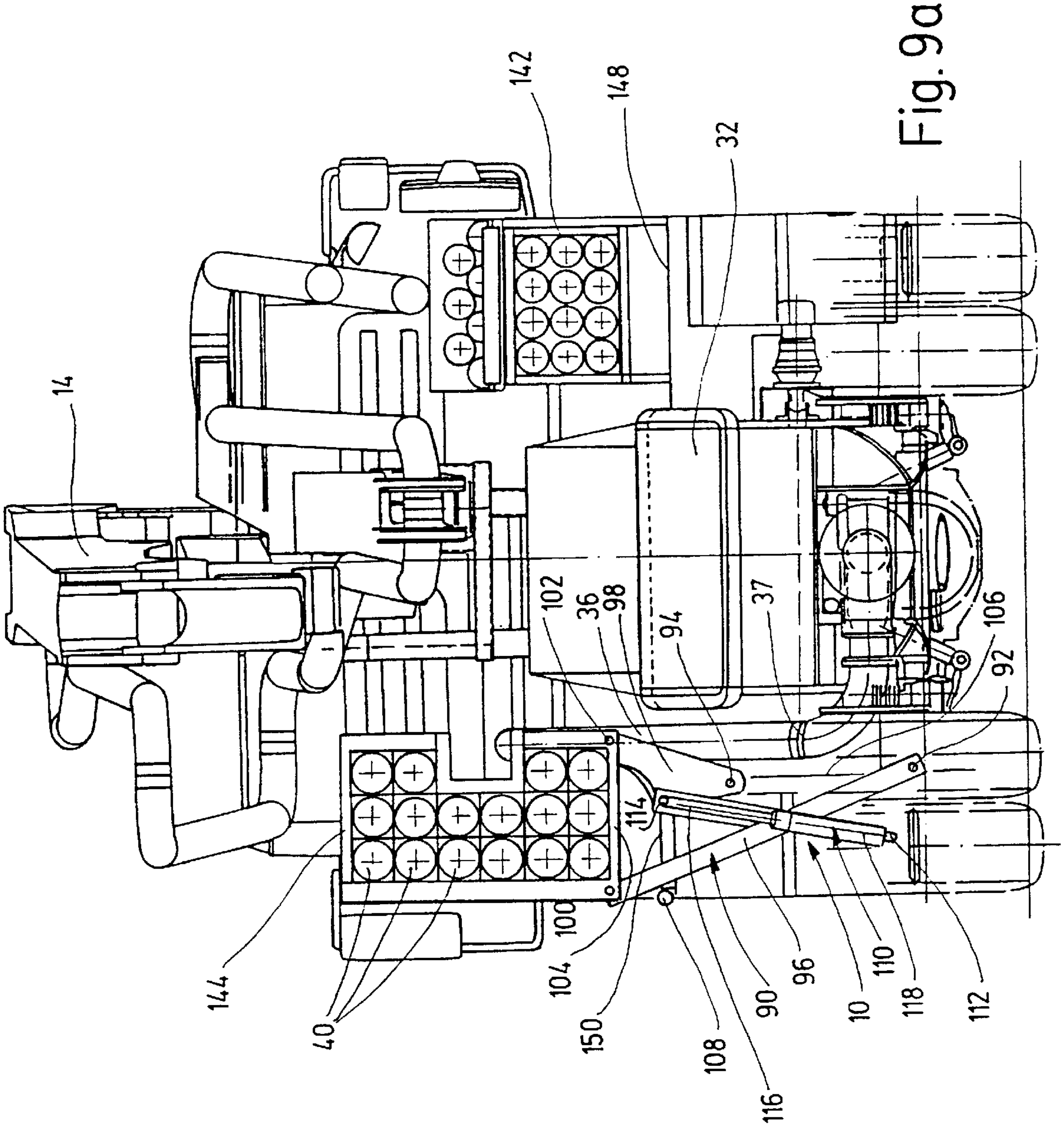
FIGS. 9*a* through *d* a view of a modified mobile concrete pump from the back with a pivotable magazine in various pivot positions.
Figure 9B:
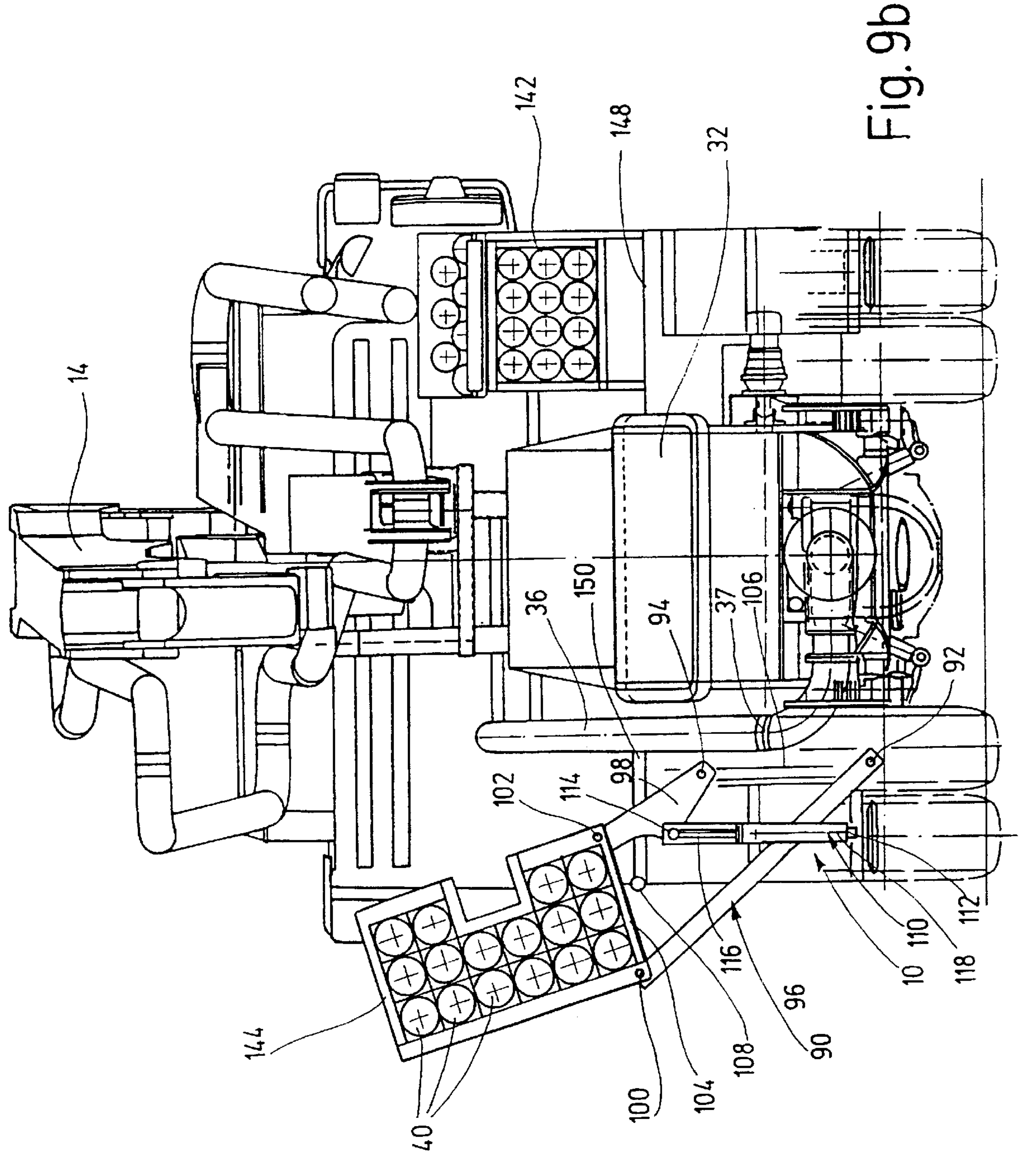
Figure 9C:
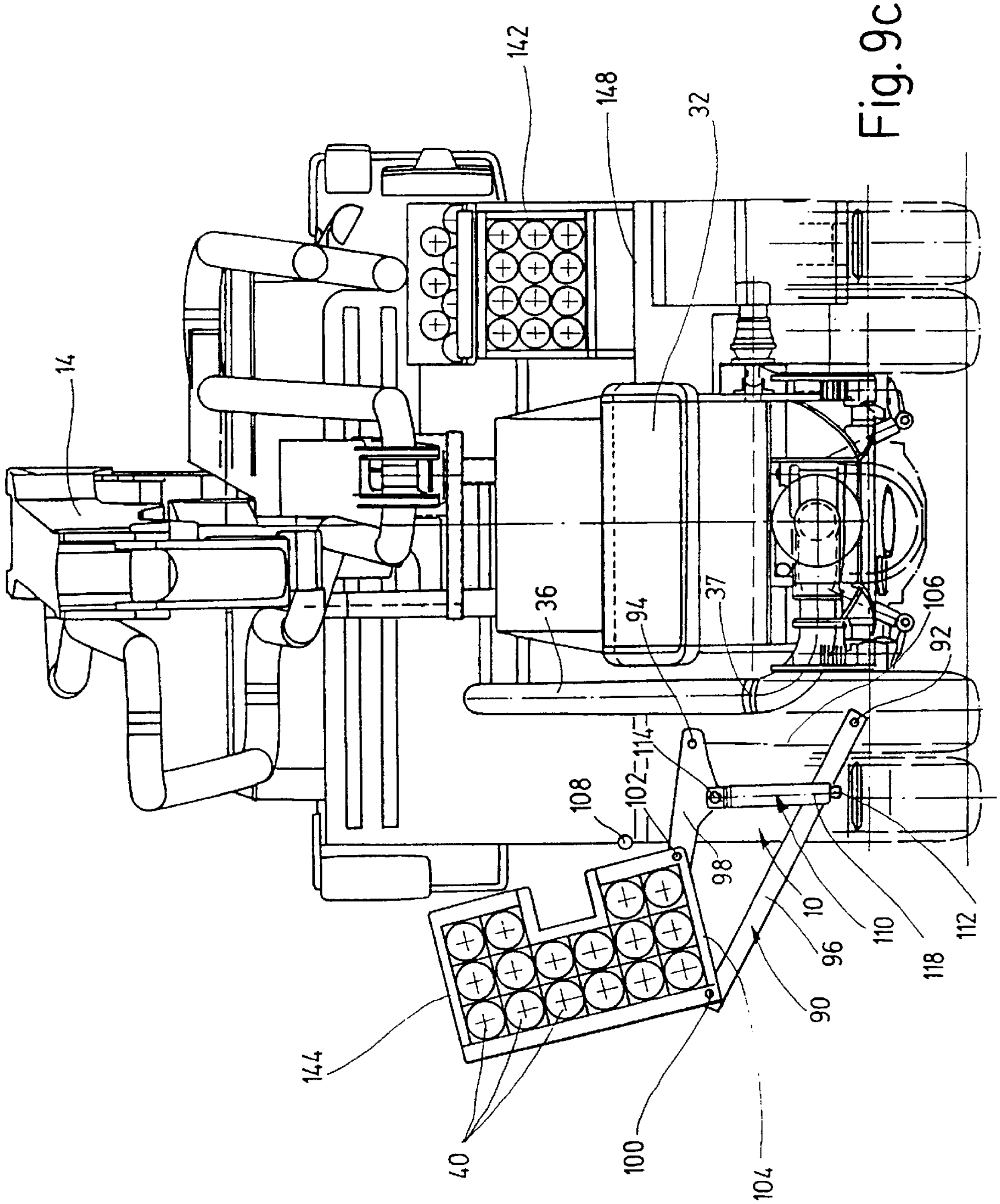
Figure 9D:
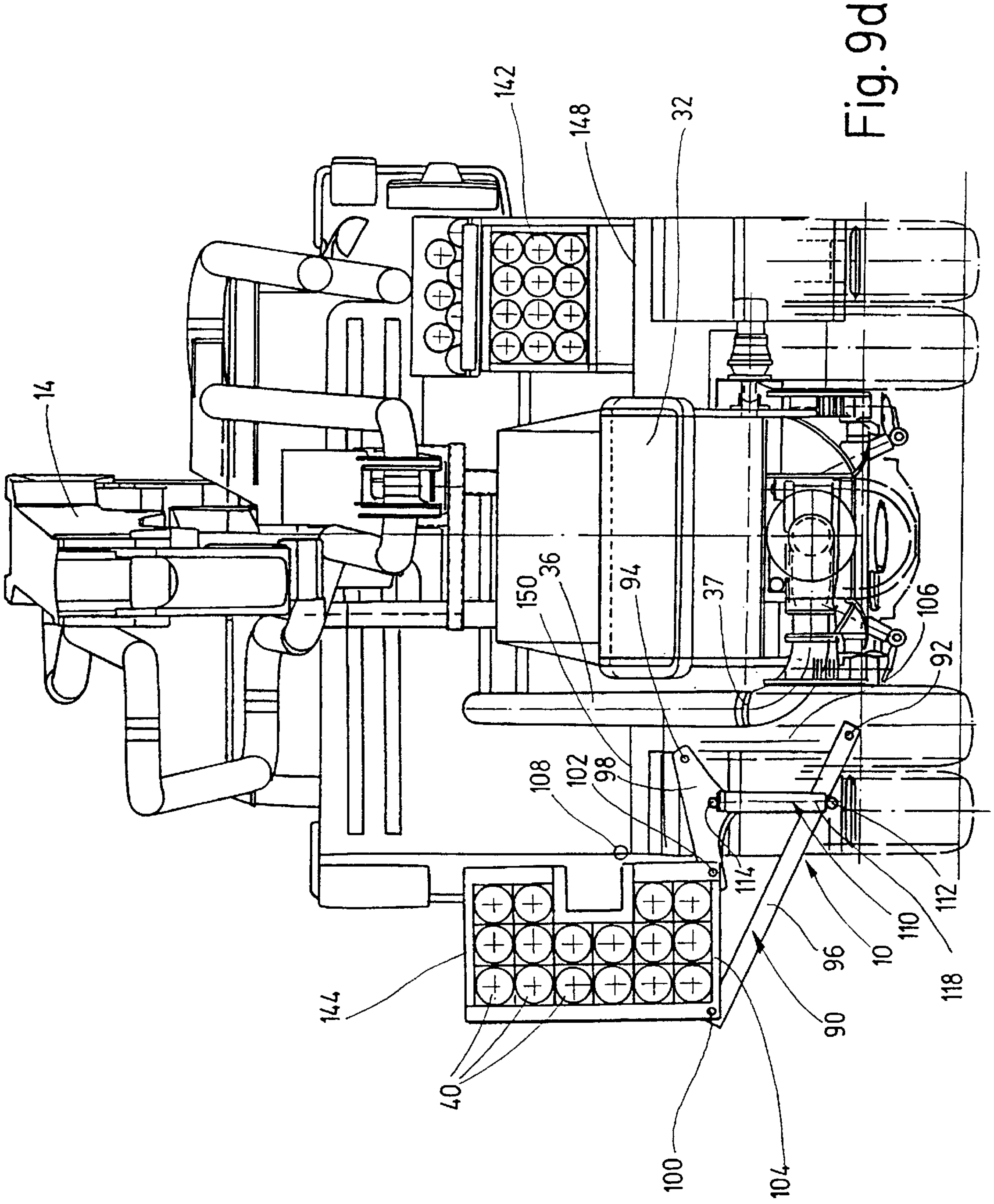

As can be seen particularly from FIG. 6*a*, the tilt axis 56 is provided or positioned approximately centrally in the bottom side 62 of the longitudinally running magazine 42, wherein in the horizontal transport position and in the tilted down unloading position the center of gravity 64 of the magazine is provided on different sides of the vertical projection of the tilt axis 56 (see FIG. 6*a*). In the transport position the magazine 42 is pushed upwards with the detent device 66 to a support strut or outrigger-fixed arrest device 68 and is secured with a deadbolt 70. The rotation and tilt process can be limited by a suitable abutment or spacing element (not shown).

Figures 5A, 5B, 5C, 5D:
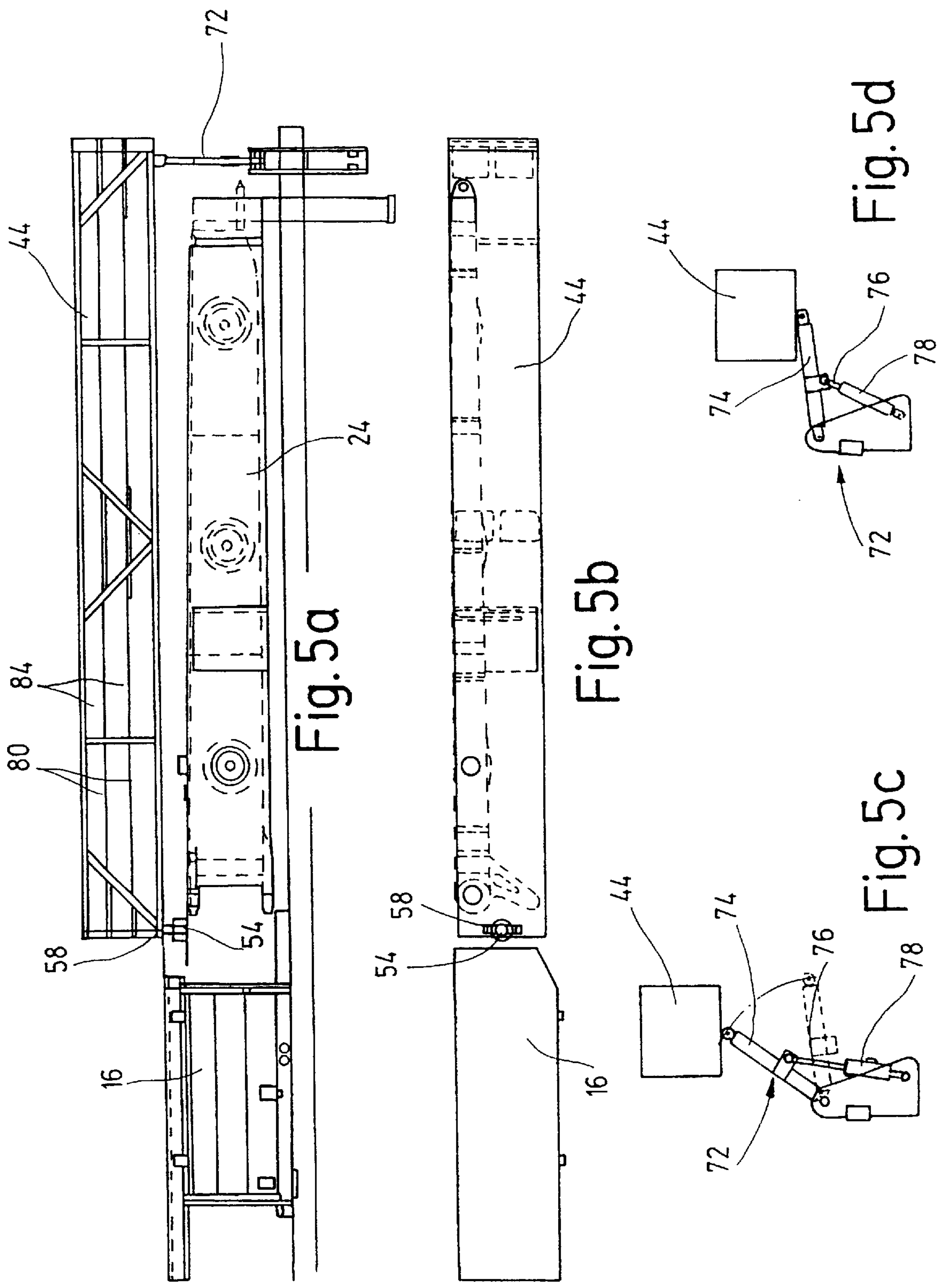
FIGS. 5*a* and *b* a side view and a top view of the one support strut and the hydraulic pivotable magazine in transport position.
FIGS. 5*c* and *d* a view of the lowering kinematics of the magazine in raised and lowered end positions.

The hydraulically pivotable magazine 44 is linked directly to the support frame 16 at a linkage point which includes the rotation axis 54 and the tilt axis 58. Further, a lowering mechanism 72 is provided there in separation from the linkage point 54, 58 in the vicinity of the rear end of the vehicle chassis 10, which includes a drive means formed as a linkage drive for lowering the magazine between the transport position (FIG. 5*c*) and the unloading position (FIG. 5*d*). In the coupling or linking element 74 of the lowering mechanism a piston rod 76 of a hydraulic cylinder 78 is linked, via which the lowering mechanism 72 can be operated. In the respective lowered unloading positions the two magazines 42, 44 are easily accessible from the rear side of the vehicle chassis. The magazine is subdivided in a honeycomb-like manner by means of intermediate walls 80 or plastic tubes 82, such that for each hose an individual compartment is available.

In FIGS. 9*a* through *d* an example of a mobile concrete pump with hose magazine is shown which deviates from that of FIGS. 1 through 8. The same parts are referenced by the same reference numbers. Absent are the rearward facing support legs pivotable over the loading surface, so that now more room is available for storage of the hose magazine 142, 144. The hose magazine 142 is therein rigidly connected to the associated loading surface 148, while the hose magazine 144 is provided moveable, tiltable or unfoldable between a transport position extending over the loading surface 150 and a thereto parallel unloading position to the side beside and below the loading surface. In the transport position the magazine is locked to the vehicle chassis.

In the shown embodiments the movement of the magazine 144 occurs with the aid of a four linkage coupling drive 90, of which the linkage axis is oriented parallel to the vehicle chassis longitudinal axis. The four linkage coupling drive includes two swing arms 96, 98 linked with their one end spaced apart from each other on linkage points 92, 94 on the vehicle chassis, and linked with their other ends to linkage points 100, 102 spaced apart from each other on the magazine floor 104. The swing arms 96, 98, the coupling element formed by the magazine floor 104 and the framework element 106 formed between the frame fixed linkage points 92, 94 are so positioned and measured, that the magazine floor 104 is parallel to the loading surface 150 both in the transport position as well as in the unloading position, and in the intermediate position pivots without contact over the free side corner or edge 108 of the loading surface. The longer swing arm 96 is linked to the outer edge corner of the magazine floor 104 and the shorter swing arm 98 is linked to the inner edge corner of the magazine floor 104, while the framework-side linkage framework 92 of the longer swing arm 96 is provided below the framework-side linkage point 94 of the short swing arm 98. As clearly shown in FIGS. 9*a* through *d*, the linkage point 92 is displaced sideways inwardly on the vehicle chassis with respect to the linkage point 94, so that the short swing arm 98 with its magazine-side linkage point 102 passes through a top dead center point prior to reaching the transport position.

The operation of the four linkage coupling drive occurs via a hydraulic cylinder 110, of which the cylinder side end is linked to a framework fixed linkage point 112 and of which the shaft or rod side end is linked to a linkage point 114 on the short swing arm 98 above the frame fixed linkage point 112. The hydraulic cylinder 110 is so designed, that the dive-in depth of its piston rod 116 in the cylinder 118 decreases continuously and gradually along the pivot path between the transport position and the unloading position.

For stability reasons, besides the four-linkage couple drive 90 shown in the figures, there is supplementally provided a four-linkage couple drive with parallel axis, spaced apart in the vehicle chassis longitudinal direction, from the four linkage couple drive shown in the drawing. The drive of the four linkage couple drive can occur either via one or via two hydraulic cylinders or via another motor drive.

In summary the following is to be concluded: The invention relates to a mobile concrete pump comprising a supporting frame 16 mounted on a chassis 10 and a pump unit 30 disposed on the supporting frame 16 and having a rear material feeder container 32. Conveyor pipes or tubes 38, 40 can be connected to the pump unit 30 and can be transported along with the mobile concrete pump in magazines 42, 44. The compartments can be easily accessed when they are moved from a transport position substantially parallel to the loading area 48, 50 into a removal position tilting downwards relative to the back end by rotating said magazines around an axis of rotation 52, 54 parallel to the vertical axis of the chassis and tilting around a tilting axis 56, 58 running crosswise in relation to the magazine longitudinal extension and perpendicular to the vertical axis of the chassis. Rotation of the magazines 42, 33 can be done manually or using hydraulic means.

What is claimed is:

1. Mobile concrete pump with a vehicle chassis (10), which includes at least one loading surface (48, 50) running along a side and parallel to the vehicle chassis longitudinal axis, wherein above the at least on one vehicle side loading surface (48, 50) a longitudinally extending box shaped magazine (42, 44) is provided for removably receiving segments of conveyor pipes or hoses (38, 40), the magazine pivotable above the at least one loading surface (48, 50) about a rotation axis (52, 54) parallel to the vehicle chassis' vertical axis between a transport position extending over the loading surface (48, 50) and an unloading position in which at least a part of the loading surface is exposed.

2. Mobile concrete pump according to claim 1, wherein the magazine (42, 44) is tiltable about a tilt axis (56, 58), which is perpendicular to its longitudinal direction and perpendicular to the vehicle chassis vertical axis, between a transport position oriented essentially parallel to the loading surface (48, 50) and an unloading position in which the rearward end is lowerable downwardly to a limited extent.

3. Mobile concrete pump according to claim 1, wherein the rotation axis (52, 54) and the tilt axis (56, 58) form a common cardanic linkage.

4. Mobile concrete pump according to claim 1, wherein on the longitudinal sides of the vehicle chassis (10) respectively one support strut (24) is provided directed rearwards, pivotable out about a pivot axis (22) parallel to the vehicle chassis vertical axis between a vehicle chassis longitudinal axis oriented transport position extending over the respective loading surface (48, 50) and a rearward directed outward pivoted support position wherein at least a part of the loading surface (48, 50) is exposed, and wherein the magazine (42, 44) is provided in a free space above the support strut (24).

5. Mobile concrete pump according to claim 4, wherein at least one of the magazines (44) is linked to a vehicle chassis fixed linkage point to thereby form a rotation and/or tilt axis (54, 58).

6. Mobile concrete pump according to claim 4, wherein at least one of the magazines (42) for at least one of its the rotation and/or tilt axis (52, 56) forming connections is linked to a linkage point which is fixed on a support strut.

7. Mobile concrete pump according to claim 5, wherein magazine (42, 44) is linked on its bottom to the linkage point.

8. Mobile concrete pump according to claim 1, wherein the magazine (42, 44) in its transport position is lockable on the vehicle chassis (10) or on the support strut (24).

9. Mobile concrete pump according to claim 5, wherein the linkage point includes a knee (60) which is provided on the vehicle chassis or on the support strut (24) rotatable about a rotation axis (52) parallel to the vehicle chassis vertical axis, and that on the knee (60) the magazine (42) is provided tiltable about a tilt axis (56).

10. Mobile concrete pump according to claim 9, wherein the tilt axis (56) is provided approximately centrally in the longitudinal extent of the magazine (42), on the floor (62) thereof, whereby the center of gravity (64) of the magazine (42) is provided on different sides of the vertical projection of the tilt axis (56) when, on the one hand, in the horizontal transport position and when, on the other hand, in the tilted unloading position.

11. Mobile concrete pump according to claim 1, wherein the rotation and/or tilt of a magazine (42, 44) is limited by a stop or abutment element.

12. Mobile concrete pump according to claim 2, wherein linkage means (72) are provided between the vehicle chassis (10) and the magazine (44), spaced apart from the associated rotation and/or tilt axis (54, 58), preferably formed as a linkage drive, for pivoting the magazine (44) between the horizontal transport position and the rotated-out and tilted end position.

13. Mobile concrete pump according to claim 12, wherein the drive means (72) is operable via hydraulic means (76, 78).

14. Mobile concrete pump, with a vehicle chassis (10), which includes at least one loading surface (48, 50) on one side of the vehicle running parallel to the vehicle chassis longitudinal axis, comprising a longitudinally extending box-shaped magazine (144) for removably receiving sections of conveyor pipes or hoses (38), which magazine is moveable, tiltable or unfoldable between a transport position which extends over the loading surface (150) and an unloading position parallel thereto and positioned sideways beside and/or below the loading surface.

15. Mobile concrete pump according to claim 14, wherein the magazine (144) when in the transport position lies on the loading surface (150).

16. Mobile concrete pump according to claim 14 wherein the magazine (144) is arrestable on the vehicle chassis (10) in the transport position.

17. Mobile concrete pump according to claim 14, wherein the magazine (144) is linked to the vehicle chassis (10) by means of a four-linkage coupling drive (90), of which the linkage axis is oriented parallel to the vehicle chassis longitudinal axis.

18. Mobile concrete pump according to claim 17, wherein the coupling drive (90) includes two swing arms, linked with their one end respectively spaced apart from each other on linkage points on the vehicle chassis (10), and linked with their respective other ends to linkage points (100, 102) spaced apart from each other on the magazine bottom (104).

19. Mobile concrete pump according to claim 18, wherein the swing arms (96, 98), the coupling element formed by the magazine floor (104) and the coupling element formed by the linkage points (92, 94) on the framework element (106) on the vehicle chassis are so positioned and dimensioned that the magazine floor (104) both in the transport position as well as in the unloading position is oriented parallel to the loading surface (150) and in the intermediate positions pivots over the free side edge (108) of the loading surface (150) without contact.

20. Mobile concrete pump according to claim 18, wherein the first, longer swing arm (96) is linked to the magazine outer edge (100) and that the second, shorter swing arm (98) is linked to the inner edge (102) of the magazine floor, whereby the frame-side linkage point (92) of the first swing arm (96) is positioned below the frame-side linkage point (94) of the second swing arm (98).

21. Mobile concrete pump according to claim 20, wherein the linkage point (92) of the first swing arm (96) is offset sideways towards inwards on the vehicle chassis (10) with respect to the linkage point (94) of the second swing arm (98).

22. Mobile concrete pump according to claim 18, wherein a gas pressure spring or a hydraulic cylinder (110) is linked in between a frame-fixed linkage point (112) and a linkage (114) on one of the moveable coupling elements (98), such that the dive-in depth of the spring rod or as the case may be the piston rod (116) in the associated cylinder (118) continuously increases or decreases along the pivot path between the transport position and the unloading position.

23. Mobile concrete pump according to claim 22, wherein the gas pressure spring or the hydraulic cylinder (110) is linked to a linkage point (114) of the shorter, second swing arm (102), which is above the frame fixed linkage point (112).

24. Mobile concrete pump according to claim 18, wherein two same-axis four-linkage couple drives (90) are provided in the vehicle chassis separation from each other in the longitudinal direction.

25. Mobile concrete pump according to claim 24, wherein each of the four-linkage coupling drives (90) is provided with a gas pressure spring or a hydraulic cylinder (110) with same-axis linkage points (112, 114).

26. Mobile concrete pump according to claim 24, wherein the two four-linkage coupling drives (90) are provided with only a single gas pressure spring or hydraulic cylinder (110).

27. Mobile concrete pump according to claim 18, wherein the four-linkage coupling drive is driveable by motorized means.

28. Mobile concrete pump according to claim 18, wherein at least one of the swing arms, preferably the shorter, second swing arm (98) with its magazine side linkage point (102) moves through a higher lying top dead center prior to reaching the transport position.

29. Mobile concrete pump according to claim 1, wherein the magazine (42, 44, 144) is subdivided into multiple parallel longitudinally oriented chambers (84) separated from each other via intermediate walls (80).

30. Mobile concrete pump according to claim 29, at least one part of the chambers (84) is formed by tubes, preferably of plastic.

31. Mobile concrete pump according to claim 1, wherein the vehicle chassis (10) is provided with a supporting frame (16), on which a pump unit (30) including rearward material supply container (32) and an unfoldable distribution mast (14) is provided, wherein the conveyor pipes or conveyor hoses are connectable to the pump unit (30) or to the distribution mast (14) and wherein at least one of the loading surfaces (48, 50, 150) is provided on the carrier frame on a side beside the vehicle chassis situated distribution mast (14).

* * * * *